Patented Nov. 4, 1930

1,780,620

UNITED STATES PATENT OFFICE

WILLIAM BARKLEY KING, OF COLUMBIA, TENNESSEE, ASSIGNOR TO ARMOUR FERTILIZER WORKS, OF CHICAGO, ILLINOIS, A CORPORATION OF NEW JERSEY

DOUBLE-SUPERPHOSPHATE MANUFACTURE

No Drawing.  Application filed January 6, 1930. Serial No. 418,999.

My present invention relates to improvements in the process or method of producing double superphosphate set forth in United States Patent 1,475,959, Double superphosphate process, Herbert H. Meyers, granted December 4, 1923.

According to such patented procedure, the double superphosphate is made by forming a slurry by adding ground phosphate-rock to commercial dilute phosphoric acid, the strength of which is insufficient to effect complete chemical reaction between the constituents of the slurry without the application of heat and consummating such chemical reaction by the application of heat and simultaneously drying the slurry to a solid product by such heat, the heating operation being performed, preferably, by running the slurry continuously into and through an inclined, rotary, direct-heat, cylindrical drier concurrently with the combustion gases with which the agitated slurry is in direct contact, the solid discharged product being in condition for immediate disintegration and then conveyance to storage or for shipment.

I have discovered that a product of better physical condition, containing less insoluble $P_2O_5$, and resulting in a somewhat better yield from the rock employed, can be made, if the slurry is not immediately dried to a solid condition as discharged from the drier, but is allowed to flow from the latter, at a temperature of approximately 180° Fahrenheit to 250° Fahrenheit, in a thick liquid condition into a pit or other suitable stationary or movable container.

On standing in the pit, the mass sets up rapidly to a solid condition, so that, at the end of from about 24 hours to 72 hours, it can be readily removed by spading or by any suitable mechanical means such as a grab-bucket.

The solid so produced in the pit contains between 10% to 30% moisture, and, consequently, it is advisable and desirable to pass it through some sort of a drier to reduce the moisture well under 10% with corresponding grade increase of the final product.

The new and improved process as at present actually commercially practised is substantially as follows:

Finely ground commercial phosphate-rock is added to crude phosphoric acid solution, containing about 16% to 20% $P_2O_5$, the ratio being approximately one pound of ground rock to each pound of $P_2O_5$ in solution, the slurry so produced being run through a direct-heat drier, heated with a coal flame, concurrently with the combustion gases, whereby a large part of the chemical reaction occurs in the drier and a very considerable percentage of the water is evaporated or driven off.

The process is so governed or controlled, however, that the material undergoing treatment is discharged or delivered from the drier as a thick liquid, at a temperature of about 220° Fahrenheit and containing anywhere from 10% to 30% water, into a pit where it sets into a rather porous solid, the chemical reaction probably being completed in such pit.

After the expiration of anywhere from about 24 hours to approximately 72 hours, such set or solidified material, containing from about 10% to 25% moisture, is dug out of the pit, either by hand or by the use of a mechanically-operated grab-bucket, and is piled up for re-handling through a drier or conveyed directly into the charging end of a small, direct-heat drier into the hot gases travelling in the same direction as such charge.

In this drier, the moisture content of the product is not only made substantially uniform but is reduced to somewhere between about 3% to 9% and the discharged product is conveyed to storage and upon disintegration is ready for shipment to the trade.

Such small or second drier may be economically heated by the waste heat gases of the first or larger drier, or it may be heated by a low coal or oil fire.

As an alternative, the thick liquid may be run direct from the drier to a movable container which when loaded may be wheeled from the discharge opening, allowed to stand until the liquid is set and then moved to the feed end of the secondary drier into the feed hopper of which the solid product is directly introduced.

A present, preferred manner of carrying out or performing the novel and improved process or method has been set forth at length herein by way of example only, and it is to be understood that changes may be incorporated therein without departure from the fundamental principles of the invention, as defined by the appended claims, and without loss of any of the substantial advantages thereof.

I claim:—

1. The process of producing double superphosphate, consisting in forming a slurry of ground phosphate-rock and dilute phosphoric acid solution, concentrating said slurry by heat to a thick liquid only, allowing such liquid to set to a solid condition after termination of said heating action, and drying said solid material.

2. The process of producing double superphosphate, consisting in forming a slurry by adding ground phosphate-rock to a dilute phosphoric acid solution of a strength insufficient to effect complete reaction with the rock without the application of heat, heating such slurry to facilitate chemical reaction between its constituents and simultaneously to concentrate the slurry to a thick liquid only, solidifying such liquid under normal atmospheric temperature after termination of said heating, and drying such solid material by the application of heat thereto.

3. The process of producing double superphosphate, consisting in forming a slurry by adding ground phosphate-rock to a dilute phosphoric acid solution containing between about 16% to 20% $P_2O_5$, about one pound of such ground rock being used for every pound of $P_2O_5$ in solution, heating such slurry to facilitate chemical reaction between its constituents and simultaneously to concentrate the slurry to a thick liquid only, allowing such liquid to set to a solid condition for from about 24 hours to 72 hours under normal atmospheric temperature after termination of such heating, and drying such solid material by the application of heat thereto to reduce its moisture content to about 3% to 9%.

4. The process of producing double superphosphate, consisting in forming a slurry by adding ground phosphate-rock to a dilute phosphoric acid solution of a strength insufficient to effect complete reaction with the rock without the application of heat, passing such slurry through a direct-heat drier concurrently with its combustion gases to facilitate the chemical reaction between the constituents of the slurry and simultaneously to concentrate the slurry to a thick liquid only, solidifying the discharged thick liquid, and drying such solid material by passing it through a heat drier.

5. The process of producing double superphosphate, consisting in forming a slurry by adding ground phosphate-rock to a dilute phosphoric acid solution of a strength insufficient to effect complete reaction with the rock without the application of heat, passing such slurry through a direct-heat drier concurrently with its combustion gases to facilitate the chemical reaction between the constituents of the slurry and simultaneously to concentrate the slurry to a thick liquid only, discharging such thick liquid from the drier, allowing it to set to a solid condition, drying such solid material by passing it through a direct-heat drier concurrently with the hot gases thereof, and heating said second drier by the waste heat gases from said first drier.

In witness whereof I have hereunto set my hand.

WILLIAM BARKLEY KING.